United States Patent
Sharp et al.

(10) Patent No.: US 11,138,087 B2
(45) Date of Patent: Oct. 5, 2021

(54) SYSTEM FOR AUTOMATICALLY EVALUATING A CHANGE IN A LARGE POPULATION OF PROCESSING JOBS

(71) Applicant: Google LLC, Mountain View, CA (US)

(72) Inventors: Mariana Sharp, Mountain View, CA (US); Craig Chambers, Seattle, WA (US); Jelena Pjesivac-Grbovic, Mountain View, CA (US); Kym Hines, Kenmore, WA (US); Sunghwan Ihm, Palo Alto, CA (US); Danijela Mijailovic, Belgrade (RS); Ben Walters, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 182 days.

(21) Appl. No.: 16/392,892

(22) Filed: Apr. 24, 2019

(65) Prior Publication Data
US 2020/0341880 A1    Oct. 29, 2020

(51) Int. Cl.
| | |
|---|---|
| *G06F 11/34* | (2006.01) |
| *G06F 11/30* | (2006.01) |
| *G06F 9/46* | (2006.01) |
| *G06F 9/445* | (2018.01) |

(52) U.S. Cl.
CPC ............ *G06F 11/3409* (2013.01); *G06F 9/46* (2013.01); *G06F 11/3006* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 6,944,584 B1* | 9/2005 | Tenney | B25J 9/1671 700/17 |
| 9,058,233 B1* | 6/2015 | Zeng | H04L 41/0813 |
| 9,223,562 B1 | 12/2015 | Sobel | |
| 9,311,066 B1 | 4/2016 | Garman et al. | |
| 9,405,582 B2* | 8/2016 | Fuller | G06F 9/5066 |
| 9,547,564 B1 | 1/2017 | Troutman et al. | |
| 9,639,345 B2* | 5/2017 | Axtell | G06F 21/00 |
| 2006/0080658 A1* | 4/2006 | Marion | G06F 8/61 717/177 |
| 2006/0248116 A1 | 11/2006 | Sobel | |
| 2010/0180040 A1 | 7/2010 | Friedman | |
| 2015/0277892 A1 | 10/2015 | Zeng | |

* cited by examiner

*Primary Examiner* — Eric C Wai
(74) *Attorney, Agent, or Firm* — Lerner, David, Littenberg, Krumholz & Mentlik, LLP

(57) ABSTRACT

Aspects of the disclosure relate to evaluating the rollout of a change to a data processing framework (DPF). A first set of jobs is selected out of a plurality of jobs. The first set of jobs is processed by the DPF with the proposed change enabled and the other jobs of the plurality of jobs by the DPF without the change enabled. A performance cost value is determined for each of the jobs in the first set of jobs processed by the DPF with the proposed change enabled and for each of the other jobs of the plurality of jobs processed by the DPF with the proposed change disabled. Based on the performance cost values of the jobs in the first set of jobs and the performance cost values of the other jobs of the plurality of jobs, a determination is made whether the proposed change is beneficial to the DPF.

20 Claims, 8 Drawing Sheets

| | Agg RAM byte-sec overhead (based on avg) | Agg RAM byte-sec overhead (based on mdn) | Agg CPU-sec overhead (based on avg) | Agg CPU-sec overhead (based on mdn) | Elapsed time sec overhead (based on avg) | # Jobs | # Runs |
|---|---|---|---|---|---|---|---|
| Feature Off | 82% | 57% | 4% | -5% | <1% | 216 | 40000 |
| Feature On | 25% | 14% | 9% | -5% | <1% | 112 | 15000 |

601 — Feature Off
603 — Feature On
600

FIGURE 6

SYSTEM FOR AUTOMATICALLY EVALUATING A CHANGE IN A LARGE POPULATION OF PROCESSING JOBS

BACKGROUND

Data processing frameworks may be configured to periodically process jobs. When a change is made to a data processing framework, the effects of the change may be different for each job. Determining the impact a change to the data processing framework has on processing jobs may become unfeasible as the number of jobs and the number of runs of each job increases. Accordingly, the impact of the change to the data processing framework on processing the jobs may be left unquantified. This failure to quantify the impact of the change on the jobs may result in changes being made to the data processing framework which have a negative impact on processing performance.

BRIEF SUMMARY

Aspects of the disclosure provide a method for evaluating the rollout of a change to a data processing framework. The method comprises receiving, by one or more processors, a proposed change to the data processing framework (DPF); selecting, by the one or more processors, a first set of jobs out of a plurality of jobs; processing, by the one or more processors, the first set of jobs by the DPF with the proposed change enabled and the other jobs of the plurality of jobs by the DPF without the proposed change enabled; determining, by the one or more processors, a performance cost value for each of the jobs in the first set of jobs processed by the DPF with the proposed change enabled and for each of the other jobs of the plurality of jobs processed by the DPF with the proposed change disabled; and determining, by the one or more processors, based on the performance cost values of the jobs in the first set of jobs and the performance cost values of the other jobs of the plurality of jobs, whether the proposed change is beneficial to the DPF.

In some examples, the method further comprises (i) upon determining the proposed change is beneficial to the DPF, adding additional jobs to the first set of jobs; (ii) processing, by the one or more processors, the first set of jobs, including the additional jobs, by the DPF with the proposed change enabled and the other jobs of the plurality of jobs by the DPF without the proposed change enabled; (iii) determining, by the one or more processors, an updated performance cost value for each of the jobs in the first set of jobs processed by the DPF with the proposed change enabled and for each of the other jobs of the plurality of jobs processed by the DPF with the proposed change disabled; and (iv) determining, by the one or more processors, based on the updated performance cost values of the jobs in the first set of jobs and the other jobs of the plurality of jobs, whether the proposed change is beneficial to the DPF. In some instances, the additional jobs are removed from the other jobs of the plurality of jobs.

In some instances, the method further comprises iteratively performing (i)-(iv) until all of the other jobs of the plurality of jobs are within the first set of jobs.

In some examples, the proposed change is beneficial when a normalized amount of time required by the DPF to process the first set of jobs is the same or faster than a normalized amount of time required by the DPF to process the other jobs of the plurality of jobs.

In some instances, the proposed change is beneficial when a normalized amount of processing resources required by the DPF to process the first set of jobs is the same or less than a normalized amount of processing resources required by the DPF to process the other jobs of the plurality of jobs.

In some examples, the performance cost values include one or more of CPU-seconds, RAM byte-seconds, elapsed time in seconds, and disk time.

Another aspect of the technology is directed to a system for evaluating the rollout of a change to a data processing framework (DPF). The system comprises: one or more processors, wherein the one or more processors are configure to: select a first set of jobs out of a plurality of jobs; process the first set of jobs by the DPF with a proposed change enabled and the other jobs of the plurality of jobs by the DPF without the proposed change enabled; determine a performance cost value for each of the jobs in the first set of jobs processed by the DPF with the proposed change enabled and for each of the other jobs of the plurality of jobs processed by the DPF with the proposed change disabled; and determine, based on the performance cost values of the jobs in the first set of jobs and the performance cost values of the other jobs of the plurality of jobs, whether the proposed change is beneficial to the DPF.

In some examples, the one or more processors are further configured to (i) add additional jobs to the first set of jobs upon determining the proposed change is beneficial to the DPF; (ii) process the first set of jobs, including the additional jobs, by the DPF with the proposed change enabled and the other jobs of the plurality of jobs by the DPF without the proposed change enabled; (iii) determine an updated performance cost value for each of the jobs in the first set of jobs processed by the DPF with the proposed change enabled and for each of the other jobs of the plurality of jobs processed by the DPF with the proposed change disabled; and (iv) determine, based on the updated performance cost values of the jobs in the first set of jobs and the other jobs of the plurality of jobs, whether the proposed change is beneficial to the DPF. In some instances, the additional jobs are removed from the other jobs of the plurality of jobs.

In some examples, the one or more processors are further configured to: iteratively perform (i)-(iv) until all of the other jobs of the plurality of jobs are within the first set of jobs.

In some instances, the proposed change is beneficial when a normalized amount of time required by the DPF to process the first set of jobs is the same or faster than a normalized amount of time required by the DPF to process the other jobs of the plurality of jobs.

In some examples, the proposed change is beneficial when a normalized amount of processing resources required by the DPF to process the first set of jobs is the same or less than a normalized amount of processing resources required by the DPF to process the other jobs of the plurality of jobs.

In some examples, the performance cost values include one or more of CPU-seconds, RAM byte-seconds, elapsed time in seconds, and disk time.

Another aspect of the disclosure is directed to a non-transitory computer-readable medium storing instructions, which when executed by one or more processors, cause the one or more processors to: select a first set of jobs out of a plurality of jobs; process the first set of jobs by a DPF with the proposed change enabled and the other jobs of the plurality of jobs by the DPF without the proposed change enabled; determine a performance cost value for each of the jobs in the first set of jobs processed by the DPF with the proposed change enabled and for each of the other jobs of the plurality of jobs processed by the DPF with the proposed change disabled; and determine, based on the performance cost values of the jobs in the first set of jobs and the performance cost values of the other jobs of the plurality of jobs, whether the proposed change is beneficial to the DPF.

In some examples, the instructions, which when executed by one or more processors, further cause the one or more processors to (i) add additional jobs to the first set of jobs upon determining the proposed change is beneficial to the DPF; (ii) process the first set of jobs, including the additional jobs, by the DPF with the proposed change enabled and the other jobs of the plurality of jobs by the DPF without the proposed change enabled; (iii) determine an updated performance cost value for each of the jobs in the first set of jobs processed by the DPF with the proposed change enabled and for each of the other jobs of the plurality of jobs processed by the DPF with the proposed change disabled; and (iv) determine, based on the updated performance cost values of the jobs in the first set of jobs and the other jobs of the plurality of jobs, whether the proposed change is beneficial to the DPF.

In some instances, the additional jobs are removed from the other jobs of the plurality of jobs.

In some examples, the instructions, which when executed by one or more processors, further cause the one or more processors to: iteratively perform (i)-(iv) until all of the other jobs of the plurality of jobs are within the first set of jobs.

In some embodiments, the proposed change is beneficial when a normalized amount of time required by the DPF to process the first set of jobs is the same or faster than a normalized amount of time required by the DPF to process the other jobs of the plurality of jobs.

In some examples, the proposed change is beneficial when a normalized amount of processing resources required by the DPF to process the first set of jobs is the same or less than a normalized amount of processing resources required by the DPF to process the other jobs of the plurality of jobs.

BRIEF DESCRIPTION OF THE DRAWINGS

FIG. 6 illustrates an example report in accordance with aspects of the disclosure.

DETAILED DESCRIPTION

Overview

Figure 1:
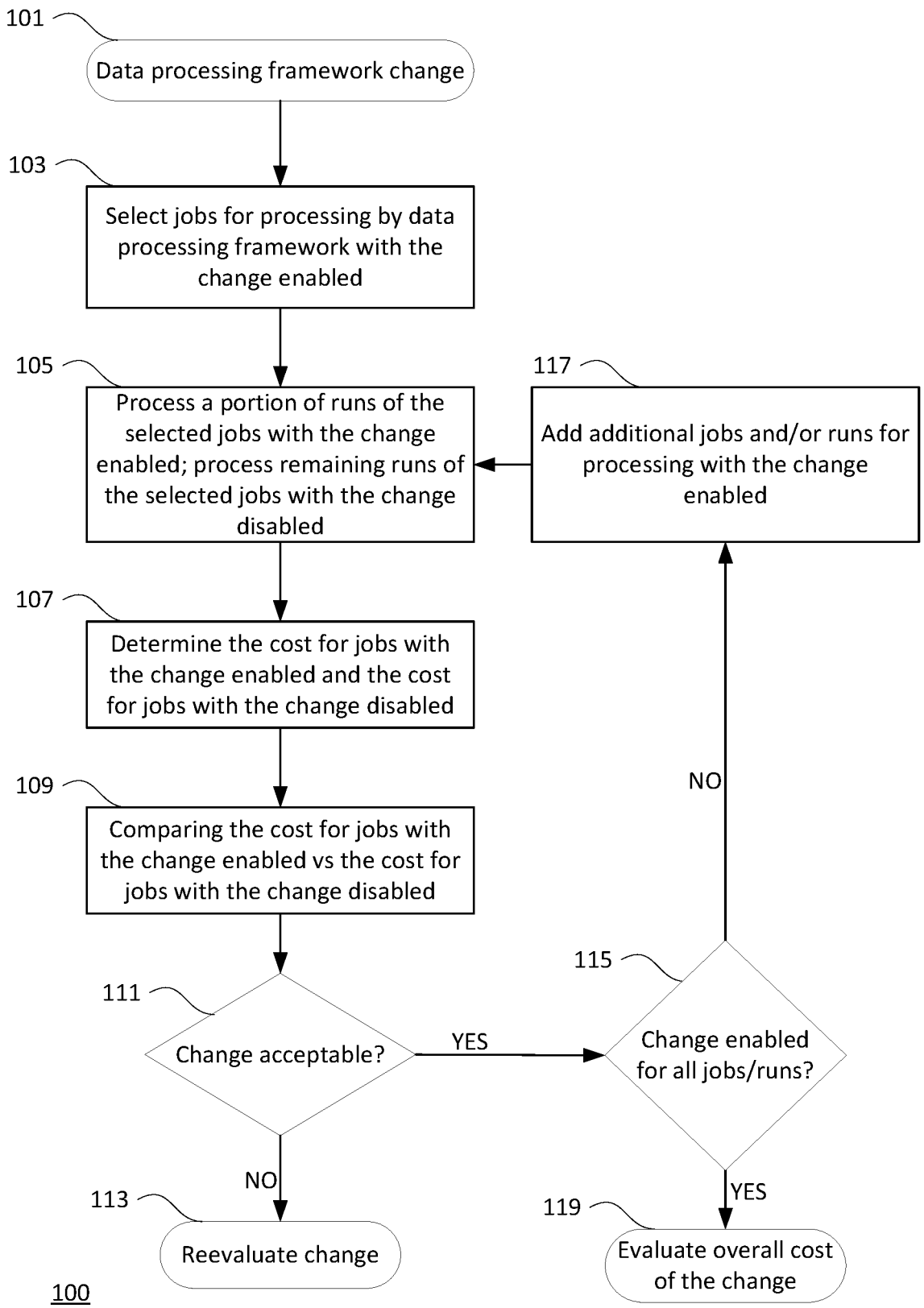
FIG. 1 is an example flow diagram in accordance with aspects of the disclosure.

The technology relates generally to evaluating the impact of a change to a data processing framework (DPF) on processing jobs. For example, and as shown in block 101 of the flow chart 100 in FIG. 1, a change may be received for implementation in the DPF. Jobs may be selected for processing by the DPF with the change enabled, as shown in block 103. A number of runs of the selected jobs may be processed by the DPF with the change enabled and all other runs in the jobs may be processed by the DPF with the change disabled, or otherwise not implemented, as shown in block 105.

The DPF may be a one or more software modules which work in conjunction to process data in bulk. In this regard, data processing frameworks are configured to process large amounts of data, in the form of jobs. The processing performed by the DPF may include data analytics, storage, searching, transfer, visualization, or any other such processing which may be required to handle large amounts of data.

When processing is completed, a performance cost analysis which determines the performance cost for jobs with the change enabled and the performance cost of processing the runs of the jobs with the change disabled may be performed, as shown in block 107. A comparison between the performance cost of processing the runs of the jobs with the change enabled against the performance cost of processing the runs of the jobs with the change disabled may be performed, as shown in block 109. A determination may be made whether the change is acceptable, or otherwise beneficial, to the DPF based on the performance cost comparisons, as shown in block 111.

In instances where the performance cost analysis indicates that the change is acceptable to the DPF, more jobs and/or runs of previously selected jobs may be added for processing by the DPF with the changed enabled, as shown in block 117. In instances where the performance cost analysis indicates that a change is detrimental to the DPF, the change may be reevaluated and/or reworked outside of the DPF, as shown in block 113. The processing and performance cost analyses of the jobs processed with and without the change enabled may continue until all, or a predetermined number/percentage of jobs and/or runs are processed by the DPF with the change enabled, as shown in block 115. The overall performance cost of implementing the change based on the performance cost analyses of the jobs processed with the change enabled against jobs processed with the change disabled once all of the jobs and/or runs, or the predetermined number of jobs and/or runs, are processed by the DPF with the change enabled, as shown in block 119.

Example Systems

Figure 2:
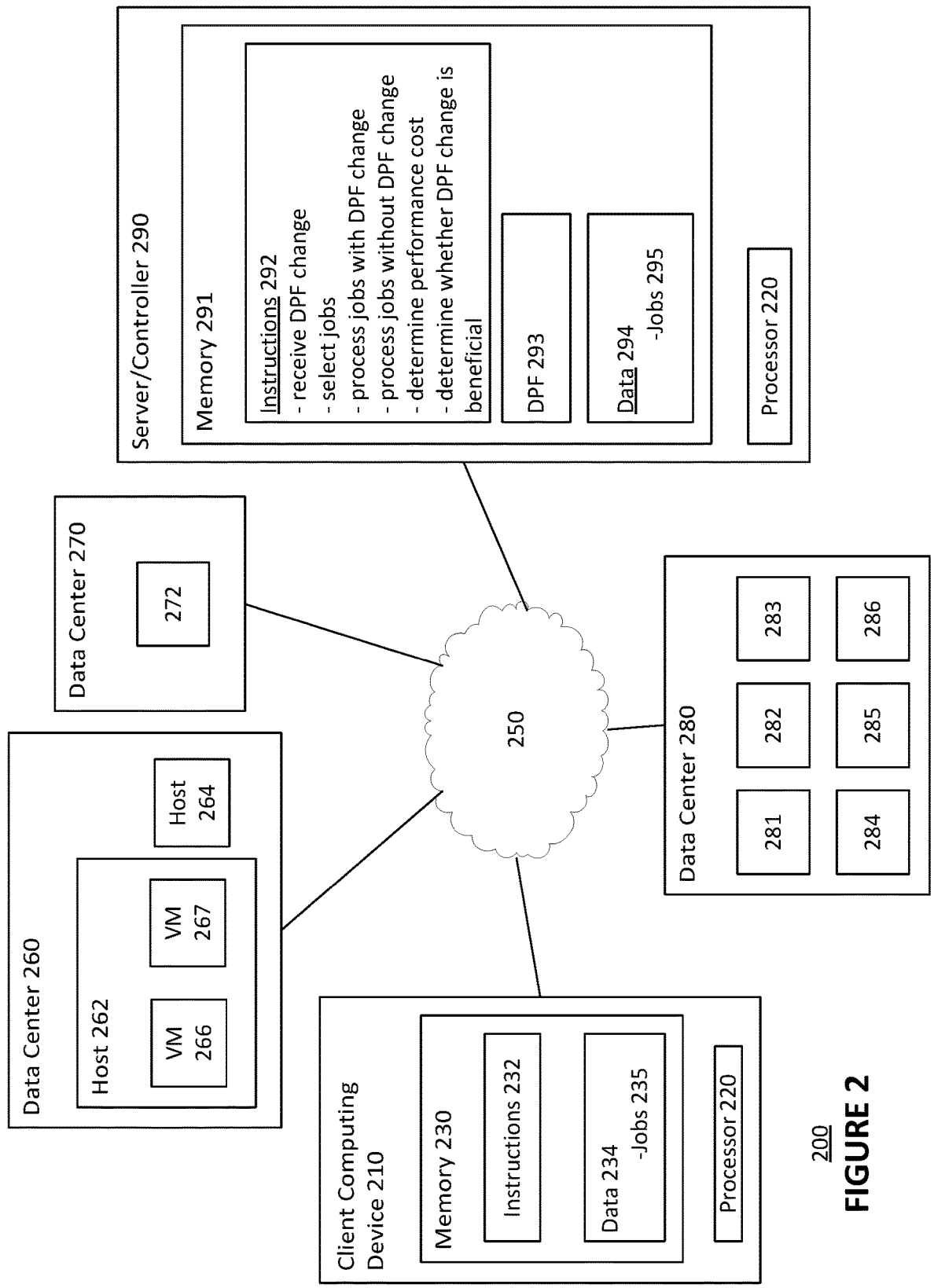
FIG. 2 is a functional diagram of an example system in accordance with aspects of the disclosure.

FIG. 2 illustrates an example system 200 including a distributed computing system (DCS). A plurality of datacenters 260, 270, 280 may be communicatively coupled, for example, over a network 250. The datacenters 260, 270, 280 may further communicate with one or more client devices, such as client computing device 210, over the network 250. Thus, for example, the client computing device 210 may execute operations in "the cloud." In some examples, the datacenters 260, 270, 280 may further communicate with a server/controller 290.

Each client computing device 210 may be a personal computer, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 220, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client computing device 210 may contain a processor 220, memory 230, and other components typically present in general purpose computers. The memory 230 can store information accessible by the processor 220, including instructions 232 that can be executed by the processor 220. Memory 230 can also include data 234 that can be retrieved, manipulated or stored by the processor 220. The memory 230 may be a type of non-transitory computer readable medium capable of storing information accessible by the processor 220, such as a hard-drive, solid state drive, tape drive, optical storage, memory card, ROM, RAM, DVD, CD-ROM, write-capable, and read-only memories. The processor 220 can be a well-known processor or other lesser-known types of processors. Alternatively, the processor 220 can be a dedicated controller such as an ASIC. Memory can also include a DPF 293, as described herein.

The instructions 232 can be a set of instructions executed directly, such as machine code, or indirectly, such as scripts, by the processor 220. In this regard, the terms "instructions," "steps" "modules" and "programs" can be used interchangeably herein. The instructions 232 can be stored in object code format for direct processing by the processor 220, or other types of computer language including scripts or collections of independent source code modules that are interpreted on demand or compiled in advance.

The DPF 293 can be a set of programs configured to process data in bulk. Although the DPF 293 is shown in only in memory 291 of controller 290, the DPF 293 may be implemented across any number of computing devices, such as the computing devices and host computing devices within datacenters 260, 270, 280.

The data 234 can be retrieved, stored or modified by the processor 220 in accordance with the instructions 232. For instance, although the system and method is not limited by a particular data structure, the data 234 can be stored in computer registers, in a DCS as a structure having a plurality of different fields and records, or documents, or buffers. The data 234 can also be formatted in a computer-readable format such as, but not limited to, binary values, ASCII or Unicode. Moreover, the data 234 can include information sufficient to identify relevant information, such as numbers, descriptive text, proprietary codes, pointers, references to data stored in other memories, including other network locations, or information that is used by a function to calculate relevant data. In some instances, the data may include one or more jobs 235, 295 for execution by the DPF 293 as described herein.

Although FIG. 2 functionally illustrates the processor 220 and memory 230 as being within the same block, the processor 220 and memory 230 may actually include multiple processors and memories that may or may not be stored within the same physical housing. For example, some of the instructions 232 and data 234 can be stored on a removable CD-ROM and others within a read-only computer chip. Some or all of the instructions and data can be stored in a location physically remote from, yet still accessible by, the processor 220. Similarly, the processor 220 can actually include a collection of processors, which may or may not operate in parallel.

The datacenters 260, 270, 280 may be positioned a considerable distance from one another. For example, the datacenters may be positioned in various countries around the world. Each datacenter 260, 270, 280 may include one or more computing devices, such as processors, servers, shards, or the like. For example, as shown in FIG. 2, datacenter 260 includes host computing devices 262, 264, datacenter 270 includes computing device 272, and datacenter 280 includes computing devices 281-286. According to some examples, the computing devices may include one or more virtual machines running on a host machine. For example, computing device 262 may be a host machine, supporting a plurality of virtual machines 266, 267 running an operating system and applications. While only a few virtual machines 266, 267 are illustrated in FIG. 2, it should be understood that any number of virtual machines may be supported by any number of host computing devices. Moreover, it should be understood that the configuration illustrated in FIG. 2 is merely an example, and that the computing devices in each of the example datacenters 260, 270, 280 may have various structures and components that may be the same or different from one another.

Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 260, 270, 280 may include any number of computing devices and/or virtual machines, and that the number of computing devices in a first datacenter may differ from a number of computing devices in a second datacenter. Moreover, it should be understood that the number of computing devices in each datacenter 260, 270, 280 may vary over time, for example, as hardware is removed, replaced, upgraded, or expanded. Programs may include the DPF, with the DPF being executed by one or more of the computing devices, virtual machines, and/or hosts in one or more datacenters 260, 270, 280.

In some examples, each datacenter 261, 270, 280 may also include a number of storage devices (not shown), such as hard drives, random access memory, disks, disk arrays, tape drives, or any other types of storage devices. The datacenters 260, 270, 280 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The datacenters may include a number of other devices in addition to the storage devices, such as cabling, routers, etc. Further, in some examples the datacenters 260, 270, 280 may be virtualized environments. Further, while only a few datacenters 260, 270, 280 are shown, numerous datacenters may be coupled over the network 250 and/or additional networks.

In some examples, the controller 290 may communicate with the computing devices in the datacenters 260, 270, 280, and may facilitate the execution of programs. For example, the controller 290 may track the capacity, status, workload, or other information of each computing device, and use such information to assign tasks and/or incorporate into log data as described herein. The controller 290 may include a processor 220 and memory 291, including data 294 and instructions 292, similar to the client computing device 210 described above. The controller 290 may be configured to populate changes affecting authorization parameters and processing parameters, such as changes to the DPF, to various components of the DCS. In some instances, these changes may be implemented without shutting down service to users and/or rolling out the changes so that only a portion of the users are affected. For example, the controller 290 may have knowledge of an organizational structure, and do mappings to populate the changes affecting the authorization parameters and/or processing parameters of the DPF throughout the organizational structure.

Client computing device 210, datacenters 260, 270, 280, and controller 290 can be capable of direct and indirect communication such as over network 250. For example, using an Internet socket, a client computing device 210 can connect to a service operating on remote servers through an Internet protocol suite. Servers can set up listening sockets that may accept an initiating connection for sending and receiving information. The network 250, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Client computing device 210 may request access to a program utilizing one of the backend systems in the cloud. Such request may be handled by the controller 290 and/or one or more of the computing devices in datacenters 260, 270, 280. When changes are made that affect the DPF, such as changing the processing programs of the data processing framework, such changes may be permeated through the DCS using inference, reasoning, and transport, without shutting down the backend systems or otherwise disrupting service to the client computing device 210.

Example Methods

In addition to the operations and systems described above and illustrated in the figures, additional operations will now be described. The following operations do not have to be performed in the precise order described below. Rather, various steps can be handled in a different order or simultaneously, and steps may also be added or omitted.

Referring back to flow chart 100, a change may be received for implementation in the DPF from a user through client computing device 210 and/or other computing devices, such as controller 290 and/or one or more of the computing devices in the datacenters 260, 270, 280, as shown block 101. Jobs may be selected for processing by the DPF, either manually by a user or according to certain criteria as described herein, with the change enabled, as shown in blocks 102 and 103. The DPF may be implemented by controller 290 and/or one or more of the computing devices in datacenters 260, 270, 280. The change being implemented in the data processing framework may include alterations in the instructions executed by the data processing framework. For example, the change may include adding additional function(s), removing existing function(s), and/or adjusting existing function(s) performed by DPF. In one example, the change may be migrating the data processing framework from one parallel processing programming model to another parallel processing programming model.

The change being implemented in the data processing framework should remain unchanged throughout the entirety of the rollout. In this regard, when the change is altered during the rollout, such as by tweaking or otherwise replacing some or all of the code associated with the change, the DPF may respond differently than how the DPF processed jobs before the change being implemented was altered. As such, evaluated performance costs of processing jobs may differ between the original change and altered changes, which may prevent an accurate assessment of the effects the change has on the DPF as the change is rolled out.

A job may be an entity, such as a unit of code that has a sequence of executions. In other words, a job may be defined as an entity that has the same or similar code executed, such as by the DPF, multiple times at different times. Each job may include one or more runs of the code. As used herein, "run" and "execution" are used interchangeably.

As used herein, a job may be identified based on criteria related to the code being executed, criteria that are related to how the code is run, and/or criteria that are related to runtime characteristics of the executed instructions within the code. All code which has the same (or similar) values for the aforementioned criteria may be considered as part of the same job. As described herein, identifying code which is part of the same job may be used to determine the performance cost of a change implemented in the DPF has on the execution of that job.

Criteria related to the code of the being executed may include the build target and/or the hash value of a workflow graph representation of the code being executed. For example, the workflow graph representation of the code being executed may be a directed acyclic graph (DAG). The graph may contain stage names, stage types, and other info related to stages within the DAG (or other such workflow graph). The entire workflow graph may be stored in a proto which defines a prototypical instantiation of an object. The object may be serialized and a hash value of the serialized proto may be hashed. The hash value of the workflow graph may be used to identify the same job. A run for a job represents one execution of the stages within the workflow graph.

Criteria related to how the code is run may include the user's name requesting the code be executed and/or the name of the file(s) which refer to the code to be executed. The name of the file may be indicative of the same job when the name is the same or similar. In this regard, slight variances between names may be ignored, such as when files differ by a date in the name or an increasing or decreasing number (e.g., job1, job2, job3, etc.).

Criteria that are related to runtime characteristics of the code may include the magnitude of input size of data processed by the code. In this regard, each time the same code is executed, the input size of the data processed by the code may be similar. In other words, the same job typically processes the same magnitude of input data each time it is executed. In instances where the magnitude of the input size of the data being processed is outside a threshold variance of the typical magnitude of the input size of data, the code being executed may belong to a different job. The magnitude may be determined by taking a logarithmic value, such as log 10, of the size of the data being processed by the code.

A limited number of jobs may be selected for processing by the data processing framework with the change enabled at the initial stage of the rollout. In this regard, the number of jobs selected for processing with the change enabled in the DPF may be based on criteria, such as a predetermined percentage of total jobs or a predetermined number of jobs. In some instances, a user may manually select jobs for processing by the DPF with the change enabled or provide the predetermined percentage or number of jobs for processing by the DPF with the change enabled.

Referring back to the flowchart 100 of FIG. 1, the selected jobs may be processed with the change enabled, as shown in block 105. The rollout of the change to the DPF may be alternating, such that some runs of selected jobs are processed with the change implemented and other runs of the selected jobs are processed with the change disabled. In this regard, in ideal operating conditions, other changes to DPF aside from the change being rolled out would be avoided. However, since these other changes may not be avoided, an alternating rollout may be used to rollout the change so that unrelated changes average out when they show up in runs with the change being rolled out enabled and disabled.

Figure 3A:
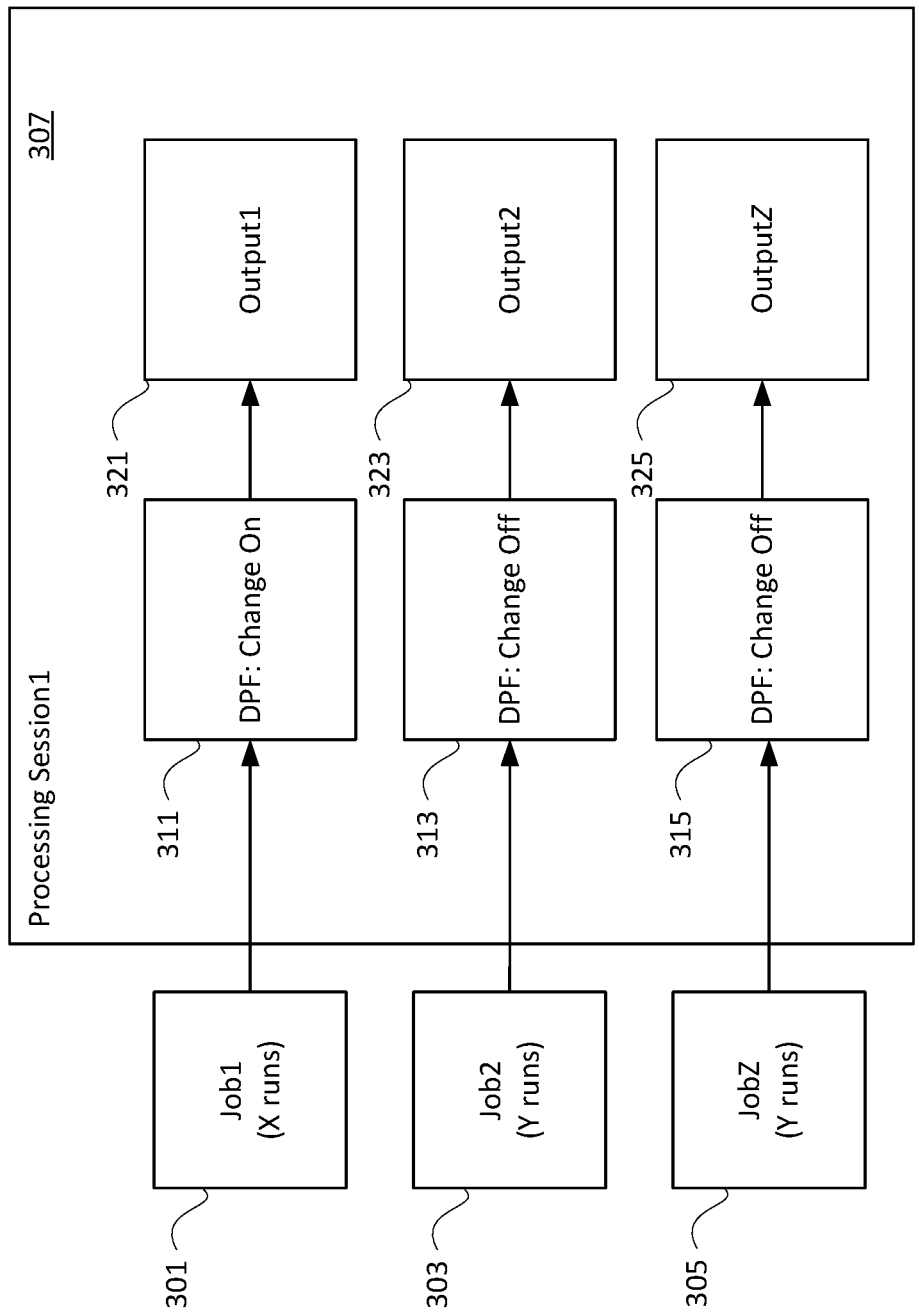
FIGS. 3A-3B are block diagrams of workflows for processing jobs in a data processing framework in accordance with aspects of the disclosure.
Figure 3B:
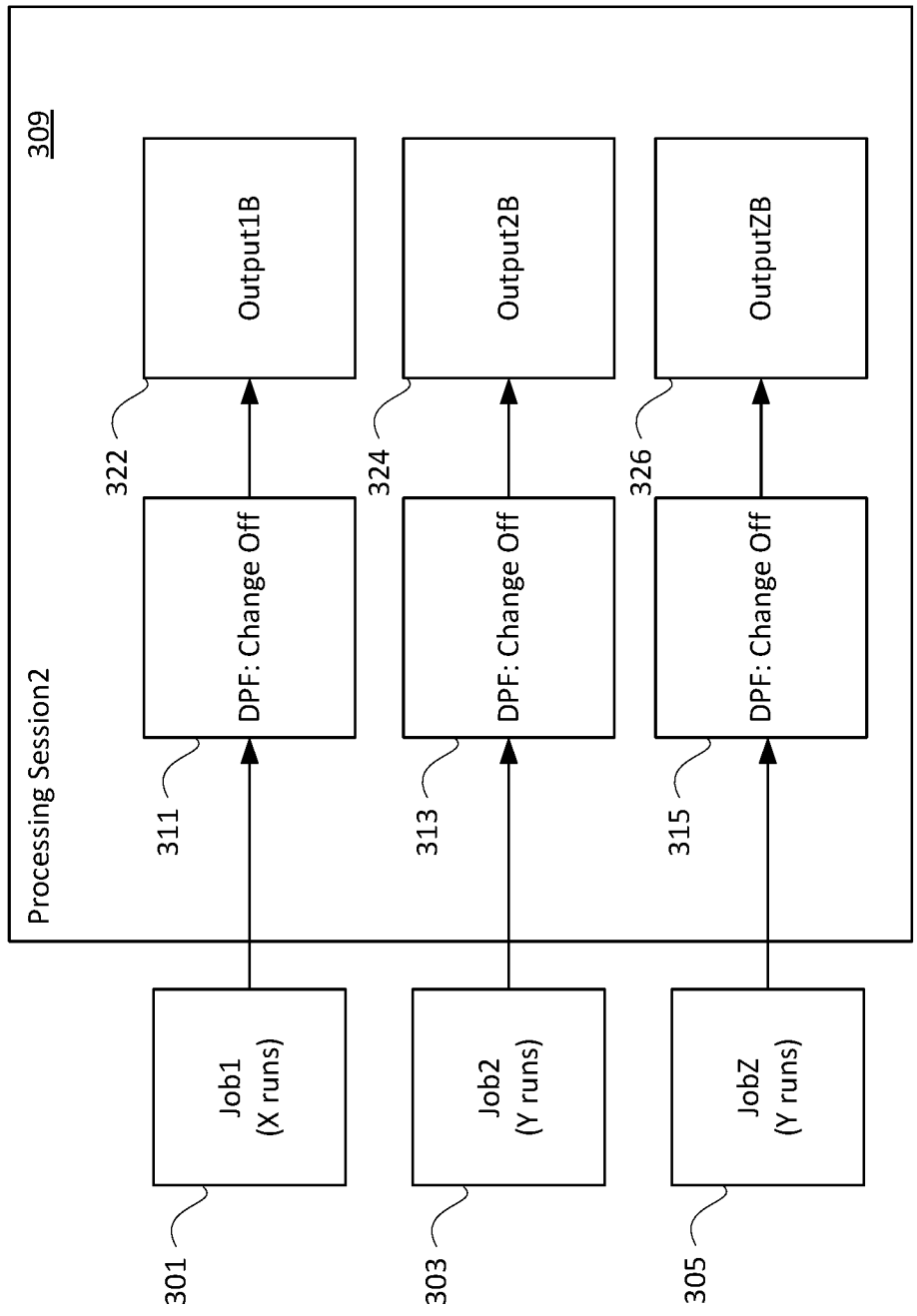

FIGS. 3A and 3B are an example of processing a selected job with an alternating rollout of the change to the DPF. As shown in FIG. 3A, the change is enabled, such as when the change is on as illustrated in block 311, for X runs of selected Job1 301 during Processing Session1 307. In this regard, all X runs of Job1 are processed with the change to the DPF enabled, where X is the number of runs in Job1. The Y runs of the other, non-selected jobs Job2 303 and JobZ 305 are processed without the change to the DPF enabled—that is "off," as illustrated in blocks 313 and 315. Although Job2 303 and JobZ 305 are both shown as having Y runs, where Y is the number of runs in the jobs, the number of runs for each job may be the same or different.

FIG. 3B shows Processing Session2 309, which occurs subsequent to Processing Session1 307, during which the X runs of Job1 are processed with the change to the DPF disabled, as illustrated in block 311. Job2 303 and JobZ 305 remain unselected for processing by the DPF during Processing Session2 209. As such, and as shown in blocks 313 and 315, all Y runs of Job2 303 and JobZ 305 are processed with the change disabled.

Upon processing the runs of the jobs, output may be generated for each run. The output may include log data such as information related to the code which was executed, information related to how the code was run, and information related to the runtime characteristics of the code. The log data information may be provided by each computing device 262, 264, 272, 281-286 and/or datacenter 260-280 which runs the jobs, and/or a controller, such as controller 290 which monitors and/or controls which computing devices/datacenters which are assigned runs of jobs. The log information may include how the job performed, the environment on which the processing was performed, job configuration data, and other data such as the capacity of the computing devices, workload of the computing devices and datacenters, and/or other such information. For example, and as illustrated in FIG. 3A, upon processing the X runs of Job1 301 with the DPF change on during Processing Session1 307, Output1 321 may be generated. Output2 321 and OutputZ 325 may be generated after processing the Y runs of Job2 303 and JobZ 305, respectively. FIG. 3B illustrates that upon processing the X runs of Job1 301 with the DPF change off during Processing Session1 307, Output1B 322 may be generated. Output2B 324 and OutputZB 326 may be generated after processing the Y runs of Job2 303 and JobZ 305, respectively.

Although only two processing sessions, Processing Session1 and Processing Session2, are shown between FIGS. 3A and 3B, any number of processing sessions may occur. Additionally, changes to the data processing framework may alternate between being enabled and disabled between sequential processing sessions. For example, a third processing session may have the change enabled and a fourth processing session may have the change disabled. In some instances, the change to the DPF may be enabled and disabled in any order between processing sessions. For instance, when four processing sessions are scheduled, the first and second processing sessions may have the change disabled for runs of selected jobs and the third and fourth processing sessions may have the change enable for runs of selected jobs. In other words, the enabling and disabling of the DPF change may not alternate between processing sessions.

Figure 4:
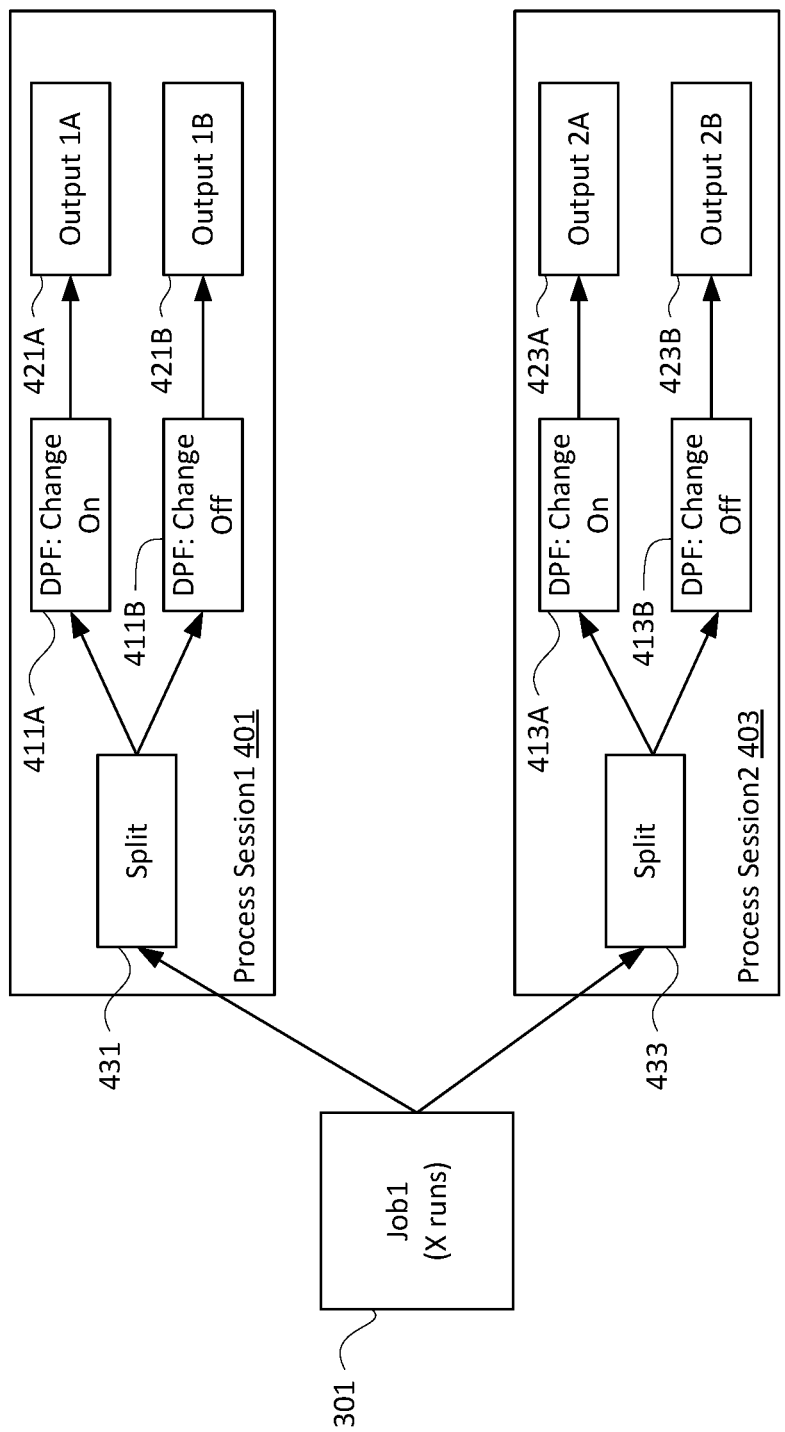
FIG. 4 is block diagrams of a workflow for processing jobs in a data processing framework in accordance with aspects of the disclosure.

In some instances, the runs of a job may be split into subsets, with the DPF change being enabled/disabled on a per subset basis. For example, FIG. 4 illustrates X runs of Job1 301 being split into two subsets in two processing sessions, Processing Session 1 401 and Processing Session2 403. During Processing Session1 401, the X runs of Job1 301 are split as shown in block 431 and during Processing Session2 403, the X runs of Job1 301 are split as shown in block 433. A first subset of the X runs of Job 301 may be processed by a first computing device, such as computing device 272, with the DPF change on, as shown by 411A and 413A. The other subset of runs may be processed with a second computing device, such as computing device 281, with the DPF change off, as shown by 411B and 413B. Although, this example includes two different computing devices being used to process the subset of jobs, the same computing devices may be used or more than two computing devices may be used. The computing devices which are used may be automatically selected by the controller 290 and/or manually selected by a user.

Upon processing the first subset of runs of Job1 301 with the DPF change on and the second subset of runs with the DPF change off, Output1A 421A and Output1B 421B may be generated, respectively. Output2A 423A and Output2B 423B may be generated after processing the first and second subset of runs of Job1 in Processing Session2 403. Although both processing sessions of FIG. 4 illustrate the change to the DPF being on for one subset of runs and off for another, the change may be on or off for both subsets of runs. Although FIG. 4 illustrates runs being split into two subsets, the runs may be split into any number of subsets with each subset having the same or different numbers of runs.

Figure 5A:
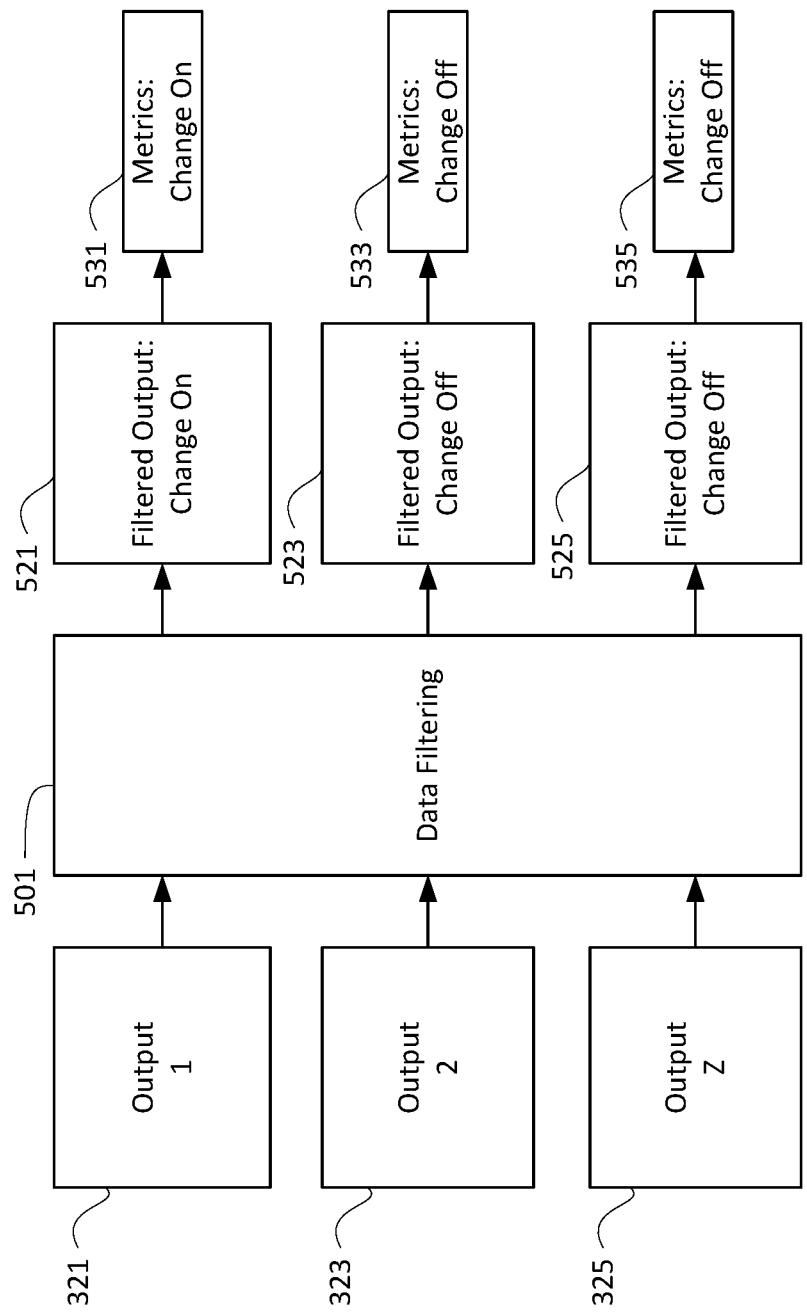
FIGS. 5A-5B are block diagrams of workflows for filtering output in a data processing framework in accordance with aspects of the disclosure.
Figure 5B:
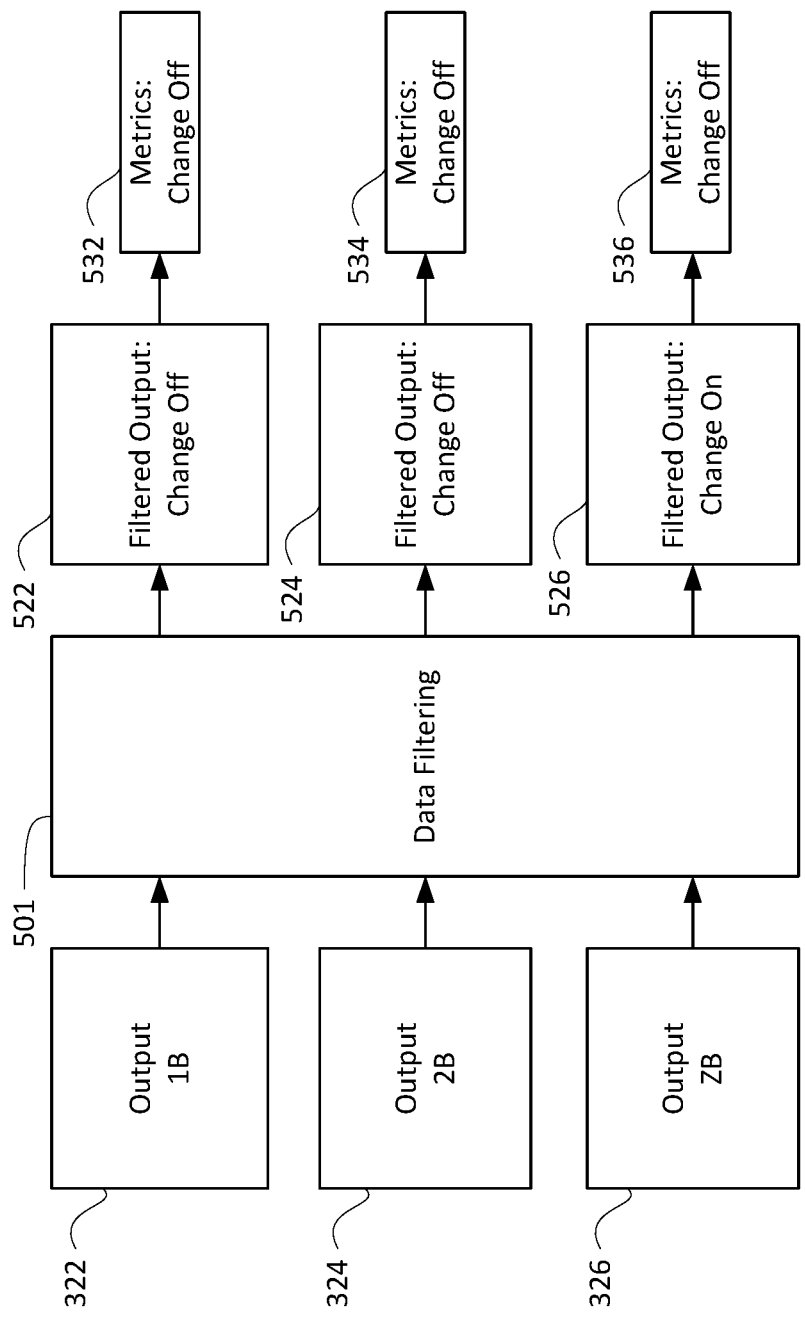

The resulting output from processing the jobs by the data processing framework may be filtered so that the performance cost analysis which compares the performance of the DPF's processing of jobs is limited to the same (or similar) jobs. In this regard, the log data in the generated output may be filtered to minimize environmental noise which may be introduced by the differences between the jobs and/or how the jobs were processed by the DPF. For instance, jobs may be filtered by criteria related to the code which was executed, criteria related to how the code was run, and criteria related to the runtime characteristics in the log data. Alternatively, or additionally, the jobs may be also filtered by other information in the log data such as overall or peak resource usage, bytes processed, metrics related to performance, job configuration—such as environmental variables or other such flags set up by a user. In some instances, jobs which don't have enough runs, such as 4 runs, or more or less, may be filtered out. For example, and as shown in FIGS. 5A and 5B, output 321-326 may be subjected to data filtering 501. Filtered Output 521-526 may be output, where Filtered Output 521 contains output corresponding to Job1 301 processed with the change on, and the other Filtered Output 522-526 corresponding to the jobs processed with the change off.

The filtered output may be input as Metrics 531-536 in a dataset for performance cost analysis, as further shown in FIGS. 5A and 5B. Referring back to the flowchart 100 of FIG. 1, these metrics may be used to determine a performance cost value of jobs processed with the change enabled vs jobs processed with the change disabled, as shown in blocks 107 and 109. In this regard, performance cost analysis may include determining the amount of time and/or processing resources required to process a job, such as CPU-seconds, RAM byte-seconds, elapsed time in seconds, disk time, total disk usage, etc., with the change enabled against a job with the change disabled. The performance costs analysis may also look at cost of graphics processing units and/or any other special-purpose hardware which may be affected by the DPF change rollout. Based on the amount of time and/or processing resources required to process a job, a performance cost value may be assigned.

In some instances, the metrics may be normalized to account for the number of jobs processed with and without the change enabled by determining a per job performance cost. Normalizing the metrics may include estimating what the overall performance cost would be if all the runs had the DPF change disabled and the overall performance cost if all the runs had the DPF change enabled. Since there is a mixture of runs with the DPF change enabled and disabled due to the alternating rollout, the metrics from the existing runs with the DPF change disabled may be used to estimate what would the runs with the DPF enabled would look like if DPF change was disabled, and vice-versa. In some instances, outlier metrics, such as metrics produced by a job which deviate by a certain value or percentage from metrics produced by other jobs may be filtered. By filtering outlier metrics, a more realistic overview of the effects the change to the DPF has on processing jobs may be realized.

The performance cost of the jobs with the change on may be compared to the performance cost of the jobs with the change off to determine if the change is beneficial, or at least not detrimental, to the data processing framework's performance, as shown in blocks 109 and 111 of FIG. 1. The determination of whether a change to the DPF is beneficial may be based on performance costs of the metrics. In this regard, when performance costs show an improvement in some or all performance costs when the change to the DPF is enabled in comparison to performance costs when the change is disabled, the change may be considered beneficial. In instances where the performance costs are worse when the DPF change is enabled relative to when the change is disabled, the change may be considered beneficial. In instances when the performance costs show both improvements in some metrics but worsening in other metrics when the DPF change is enabled relative to when the DPF change is disabled, the change may be considered beneficial or detrimental depending on rollout criteria. In this regard, the rollout criteria may allow for worsening of performance costs for some metrics but not others, or other such scenarios. In some instances, user evaluation may be requested to determine if a change to the DPF is beneficial or detrimental.

An example report 600 illustrating possible performance costs are shown in FIG. 6. In the first row 601, the performance costs of jobs with the change to the DPF off are shown. In the second row 603, the performance costs of jobs with the change to the DPF on are shown. The performance costs in the first and second rows include aggregated RAM byte-sec overhead based on average, aggregated RAM byte-sec overhead based on median, aggregated CPU-sec overhead based on average, aggregated CPU-sec overhead based on media, and elapsed time sec overhead based on average. Also within the first and second rows 601, 603 are the number of jobs executed with the change to DPF off and on, as well as the total number of runs of the jobs. As shown in the example report 600, improvements in job processing by the DPF with the change enabled happen in all performance costs aside from aggregated CPU-sec overhead based on average. The example performance costs shown in FIG. 6 are simply for illustration purposes, and other performance costs may be included.

When the change to the data processing framework is found to be beneficial, the data processing framework may process a larger numbers of jobs in a later occurring processing session with the change on, such as blocks 115 and 117 of FIG. 1. For example, and referring back to FIGS. 3A and 3B, in an instance where the change to the DPF is found to be beneficial after Processing Session1 and Processing Session2, additional jobs, such as Job2 303 and/or JobZ 305, may be selected for processing. The number of jobs which are processed with the change may continue to increase in later processing sessions, so long as the change continues to be found beneficial. In the event the change is shown to be not beneficial, the change may be reevaluated and/or reworked outside of the DPF, as shown in block 113 of FIG. 1.

The processing and performance cost analyses of the jobs processed with and without the change enabled may continue until a predetermined number, or percentage, of jobs are processed by the DPF with the change enabled. For instance, once 80% of the jobs, or more or less, are being processed with the change on, and the performance cost analysis is showing the change is beneficial, the change may be rolled out to all jobs. In some instances, the performance cost analyses of the jobs may only stop once the job has been rolled out to all jobs. Once the change to the DPF is rolled out to all jobs, a final evaluation of the overall performance cost of the change may be determined, as shown in block 119 of FIG. 1

The features described herein allow quantification of the impact of a change to a data processing framework on processing jobs over the course of a rollout. By doing such, the effects of the change may be evaluated over a large number of jobs which may provide a more complete picture of the overall performance cost of implementing the change. As such, changes which have a negative impact on processing performance by the DPF may be avoided. Additionally, by alternatively rolling out the change to the DPF, jobs which performance cost shows a detrimental effect may be reviewed to determine the underlying cause of the detrimental effect and to allow for focused debugging efforts of the change. For example, a user may determine jobs affected the worst by the change, and narrow investigation for those.

Unless stated otherwise, the foregoing alternative examples are not mutually exclusive. They may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for evaluating the rollout of a change to a data processing framework, the method comprising:
   receiving, by one or more processors, a proposed change to the data processing framework (DPF);
   selecting, by the one or more processors, a first set of jobs out of a plurality of jobs;
   enabling, by the one or more processors, the proposed change within the DPF; processing, by the one or more processors, the first set of jobs using the DPF with the proposed change enabled;
   disabling, by the one or more processors, the proposed change within the DPF; processing, by the one or more processors, the other jobs of the plurality of jobs using the DPF with the proposed change disabled;
   determining, by the one or more processors, a performance cost value for each of the jobs in the first set of jobs processed using the DPF with the proposed change enabled and for each of the other jobs of the plurality of jobs processed using the DPF with the proposed change disabled; and
   determining, by the one or more processors, based on the performance cost values of the jobs in the first set of jobs and the performance cost values of the other jobs of the plurality of jobs, whether the proposed change is beneficial to the DPF.

2. The method of claim 1, further comprising:
   (i) upon determining the proposed change is beneficial to the DPF, adding additional jobs to the first set of jobs;
   (ii) processing, by the one or more processors, the first set of jobs, including the additional jobs, using the DPF with the proposed change enabled and the other jobs of the plurality of jobs using the DPF with the proposed change disabled;
   (iii) determining, by the one or more processors, an updated performance cost value for each of the jobs in the first set of jobs processed using the DPF with the proposed change enabled and for each of the other jobs of the plurality of jobs processed using the DPF with the proposed change disabled; and
   (iv) determining, by the one or more processors, based on the updated performance cost values of the jobs in the first set of jobs and the other jobs of the plurality of jobs, whether the proposed change is beneficial to the DPF.

3. The method of claim 2, wherein the additional jobs are removed from the other jobs of the plurality of jobs.

4. The method of claim 2, further comprising:
   iteratively performing (i)-(iv) until all of the other jobs of the plurality of jobs are within the first set of jobs.

5. The method of claim 1, wherein the proposed change is beneficial when a normalized amount of time required by the DPF to process the first set of jobs is the same or faster than a normalized amount of time required by the DPF to process the other jobs of the plurality of jobs.

6. The method of claim 1, wherein the proposed change is beneficial when a normalized amount of processing resources required by the DPF to process the first set of jobs is the same or less than a normalized amount of processing resources required by the DPF to process the other jobs of the plurality of jobs.

7. The method of claim 1, wherein the performance cost values include one or more of CPU-seconds, RAM byte-seconds, elapsed time in seconds, and disk time.

8. A system for evaluating the rollout of a change to a data processing framework (DPF), the system comprising: one or more processors, wherein the one or more processors are configured to:
   select a first set of jobs out of a plurality of jobs;
   enable the proposed change within the DPF;
   process the first set of jobs using the DPF with a proposed change enabled;
   disable the proposed change within the DPF;
   process the other jobs of the plurality of jobs using the DPF with the proposed change disabled;
   determine a performance cost value for each of the jobs in the first set of jobs processed using the DPF with the proposed change enabled and for each of the other jobs of the plurality of jobs processed using the DPF with the proposed change disabled; and
   determine, based on the performance cost values of the jobs in the first set of jobs and the performance cost values of the other jobs of the plurality of jobs, whether the proposed change is beneficial to the DPF.

9. The system of claim 8, wherein the one or more processors are further configured to:
   (i) add additional jobs to the first set of jobs upon determining the proposed change is beneficial to the DPF;
   (ii) process the first set of jobs, including the additional jobs, using the DPF with the proposed change enabled and the other jobs of the plurality of jobs using the DPF with the proposed change disabled;
   (iii) determine an updated performance cost value for each of the jobs in the first set of jobs processed using the DPF with the proposed change enabled and for each of the other jobs of the plurality of jobs processed using the DPF with the proposed change disabled; and
   (iv) determine, based on the updated performance cost values of the jobs in the first set of jobs and the other jobs of the plurality of jobs, whether the proposed change is beneficial to the DPF.

10. The system of claim 9, wherein the additional jobs are removed from the other jobs of the plurality of jobs.

11. The system of claim 9, wherein the one or more processors are further configured to:
    iteratively perform (i)-(iv) until all of the other jobs of the plurality of jobs are within the first set of jobs.

12. The system of claim 8, wherein the proposed change is beneficial when a normalized amount of time required by the DPF to process the first set of jobs is the same or faster than a normalized amount of time required by the DPF to process the other jobs of the plurality of jobs.

13. The system of claim 8, wherein the proposed change is beneficial when a normalized amount of processing resources required by the DPF to process the first set of jobs is the same or less than a normalized amount of processing resources required by the DPF to process the other jobs of the plurality of jobs.

14. The system of claim 8, wherein the performance cost values include one or more of CPU-seconds, RAM byte-seconds, elapsed time in seconds, and disk time.

15. A non-transitory computer-readable medium storing instructions, which when executed by one or more processors, cause the one or more processors to:
    receive a proposed change to a data processing framework (DPF);
    select a first set of jobs out of a plurality of jobs;
    enable the proposed change within the DPF;
    process the first set of jobs using the DPF with the proposed change enabled;
    disable the proposed change within the DPF;

process the other jobs of the plurality of jobs using the DPF with the proposed disabled;

determine a performance cost value for each of the jobs in the first set of jobs processed using the DPF with the proposed change enabled and for each of the other jobs of the plurality of jobs processed using the DPF with the proposed change disabled; and determine, based on the performance cost values of the jobs in the first set of jobs and the performance cost values of the other jobs of the plurality of jobs, whether the proposed change is beneficial to the DPF.

16. The non-transitory computer-readable medium of claim 15, wherein the instructions, which when executed by one or more processors, further cause the one or more processors to:
   (i) add additional jobs to the first set of jobs upon determining the proposed change is beneficial to the DPF;
   (ii) process the first set of jobs, including the additional jobs, using the DPF with the proposed change enabled and the other jobs of the plurality of jobs using the DPF with the proposed change disabled;
   (iii) determine an updated performance cost value for each of the jobs in the first set of jobs processed using the DPF with the proposed change enabled and for each of the other jobs of the plurality of jobs processed using the DPF with the proposed change disabled; and
   (iv) determine, based on the updated performance cost values of the jobs in the first set of jobs and the other jobs of the plurality of jobs, whether the proposed change is beneficial to the DPF.

17. The non-transitory computer-readable medium of claim 16, wherein the additional jobs are removed from the other jobs of the plurality of jobs.

18. The non-transitory computer-readable medium of claim 16, wherein the instructions, which when executed by one or more processors, further cause the one or more processors to:
   iteratively perform (i)-(iv) until all of the other jobs of the plurality of jobs are within the first set of jobs.

19. The non-transitory computer-readable medium of claim 15, wherein the proposed change is beneficial when a normalized amount of time required by the DPF to process the first set of jobs is the same or faster than a normalized amount of time required by the DPF to process the other jobs of the plurality of jobs.

20. The non-transitory computer-readable medium of claim 15, wherein the proposed change is beneficial when a normalized amount of processing resources required by the DPF to process the first set of jobs is the same or less than a normalized amount of processing resources required by the DPF to process the other jobs of the plurality of jobs.

* * * * *